United States Patent
Patankar

(10) Patent No.: US 9,008,895 B2
(45) Date of Patent: Apr. 14, 2015

(54) NON-DETERMINISTIC MAINTENANCE REASONER AND METHOD

(75) Inventor: Ravindra Patankar, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 314 days.

(21) Appl. No.: 13/552,440

(22) Filed: Jul. 18, 2012

(65) Prior Publication Data

US 2014/0025250 A1    Jan. 23, 2014

(51) Int. Cl.
| | |
|---|---|
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |
| G06Q 10/00 | (2012.01) |
| G07C 5/08 | (2006.01) |

(52) U.S. Cl.
CPC .............. *G06Q 10/20* (2013.01); *G07C 5/0808* (2013.01)

(58) Field of Classification Search
USPC ........... 701/29.4, 29.1, 29.6, 29.7, 29.9, 30.2, 701/31.4, 31.6, 32.9, 34.3
See application file for complete search history.

(56) References Cited

U.S. PATENT DOCUMENTS

| | | | |
|---|---|---|---|
| 5,210,704 A | 5/1993 | Husseiny | |
| 7,209,814 B2 * | 4/2007 | Kipersztok et al. | 701/31.6 |
| 7,668,632 B2 * | 2/2010 | Vian et al. | 701/29.3 |
| 8,437,904 B2 * | 5/2013 | Mansouri et al. | 701/29.1 |
| 8,543,280 B2 * | 9/2013 | Ghimire et al. | 701/29.1 |
| 8,543,282 B2 * | 9/2013 | Hansson et al. | 701/29.3 |
| 2004/0176868 A1 | 9/2004 | Haga et al. | |
| 2008/0234979 A1 | 9/2008 | Costiner et al. | |

FOREIGN PATENT DOCUMENTS

| | | |
|---|---|---|
| JP | 2005148955 A | 6/2005 |
| WO | 03032131 A2 | 4/2003 |
| WO | 2011048380 A1 | 4/2011 |

OTHER PUBLICATIONS

EP Search Report for Application No. EP 13 174 969.9 dated Oct. 23, 2013.
Statement in accordance with the Notice from the European Patent Office dated Oct. 1, 2007 concerning business methods (OJ Nov. 2007; pp. 592-593), XP007905525, Nov. 1, 2007.
Ghosh, D., Roy, S.: Maintenance Optimization Using Probabilistic Cost-Benefit Analysis, Journal of Loss Prevention in the Process Industries, vol. 22, No. 4, pp. 403-407, Jul. 2009, Elsevier Ltd.

(Continued)

*Primary Examiner* — Nicholas Kiswanto
(74) *Attorney, Agent, or Firm* — Ingrassia Fisher & Lorenz, P.C.

(57) ABSTRACT

A system and method for supplying a corrective maintenance plan for a system includes supplying diagnostic data to a processor. The diagnostic data are representative of a set of two or more potential independent faults within the system, and each of the potential independent faults in the set has a unique corrective maintenance plan associated therewith. The diagnostic data are processed, in the processor, to select only one of the corrective maintenance plans. Maintenance plan data representative of the selected corrective maintenance plan are generated in the processor. For identical sets of two or more potential independent faults, the selected maintenance plan is not always the same.

9 Claims, 2 Drawing Sheets

(56) References Cited

OTHER PUBLICATIONS

Ghiocel, D. M., Altmann, J.: Nondeterministic Hybrid Architectures for Vehicle Health Management—Chapter 41 of the Engineering Design Reliability Handbook, CRC Press LLC, 2004.

Van Horenbeek, A., Pintelon, L.: Optimal Prognostic Maintenance Planning for Multi-Component Systems; Advances in Safety, Reliability and Risk Management—Proceedings of the European Safety and Reliability Conference, ESREL 2011, pp. 910-917, 2012, Taylor and Francis Inc.

Hagmark, P., Virtanen, S.: Simulation and Calculation of Reliability Performance and Maintenance Costs; Proceedings—Annual Reliability and Maintainability Symposium, pp. 34-40, 2007; Institute of Electrical and Electronics Engineers Inc.

EP Examination Report for Application No. EP 13 174 969.9-1955 dated Jan. 24, 2014.

* cited by examiner

| Mx PLAN → <br> ACTUAL FAILURE ↓ | REPAIR1 + IF NEEDED REPAIR2 | REPAIR2 + IF NEEDED REPAIR1 | REPAIR1 + REPAIR2 | PROBABILITY OF FAILURE MODES |
|---|---|---|---|---|
| FAULT 1 | 3 | 6 | 5 | p |
| FAULT 2 | 6 | 3 | 5 | (1-p) |
| AVERAGE Mx PLAN COST | 3p + 6(1-p) | 6p + 3(1-p) | 5p + 5(1-p) | |

FIG. 2

NON-DETERMINISTIC MAINTENANCE REASONER AND METHOD

TECHNICAL FIELD

The present invention generally relates to a maintenance reasoner for a vehicle health management system, and more particularly relates to a non-deterministic maintenance reasoner and method.

BACKGROUND

Various systems, such as various types of vehicles and the systems and subsystems that comprise the vehicles, may be subject to potentially severe environmental conditions, shock, vibration, and normal component wear. These conditions, as well as others, may have deleterious effects on vehicle operability. These deleterious effects, if experienced during operation, may require some type of corrective action. Hence, most notably in the context of vehicles, health monitoring/management systems are increasingly being used.

Vehicle health monitoring/management systems monitor various health/maintenance-related characteristics of the vehicle, and include a maintenance reasoner. Typically, a maintenance reasoner processes the health/maintenance-related information and provides maintenance action recommendations in the order of utility. Presently known maintenance reasoners are deterministic, meaning the reasoners provide the same result every time they are supplied with the same health/maintenance-related information.

Although deterministic maintenance reasoners are generally reliable and robust, they do suffer certain drawbacks. In particular, deterministic reasoners cannot properly function with incomplete information, and thus require certain inputs to produce an output. If some of these inputs are not available, then certain values are assumed for these inputs. Using assumed values for unavailable inputs can lead to non-optimal results.

Hence, there is a need for a maintenance reasoner that will provide optimal results when complete information is not available. The present invention addresses at least this need.

BRIEF SUMMARY

In one embodiment, a method for supplying a corrective maintenance plan for a system includes supplying diagnostic data to a processor. The diagnostic data are representative of a set of two or more potential independent faults within the system, and each of the potential independent faults in the set has a unique corrective maintenance plan associated therewith. The diagnostic data are processed, in the processor, to select only one of the corrective maintenance plans. Maintenance plan data representative of the selected corrective maintenance plan are generated in the processor. For identical sets of two or more potential independent faults, the selected maintenance plan is not always the same.

In another embodiment, a non-deterministic maintenance reasoner system includes a data source and a processor. The data source is configured to supply diagnostic data representative of a set of two or more potential independent faults within a system. Each of the potential independent faults in the set has a unique corrective maintenance plan associated therewith. The processor is in operable communication with the data source to at least selectively retrieve the diagnostic data therefrom, and is configured to process the diagnostic data to select only one of the corrective maintenance plans, and generate maintenance plan data representative of the selected corrective maintenance plan. For identical sets of two or more potential independent faults, the selected maintenance plan is not always the same.

Furthermore, other desirable features and characteristics of the non-deterministic reasoner and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 2 depicts a table of the costs of implementing unique maintenance plans associated with two potential independent faults.

DETAILED DESCRIPTION

Figure 1:
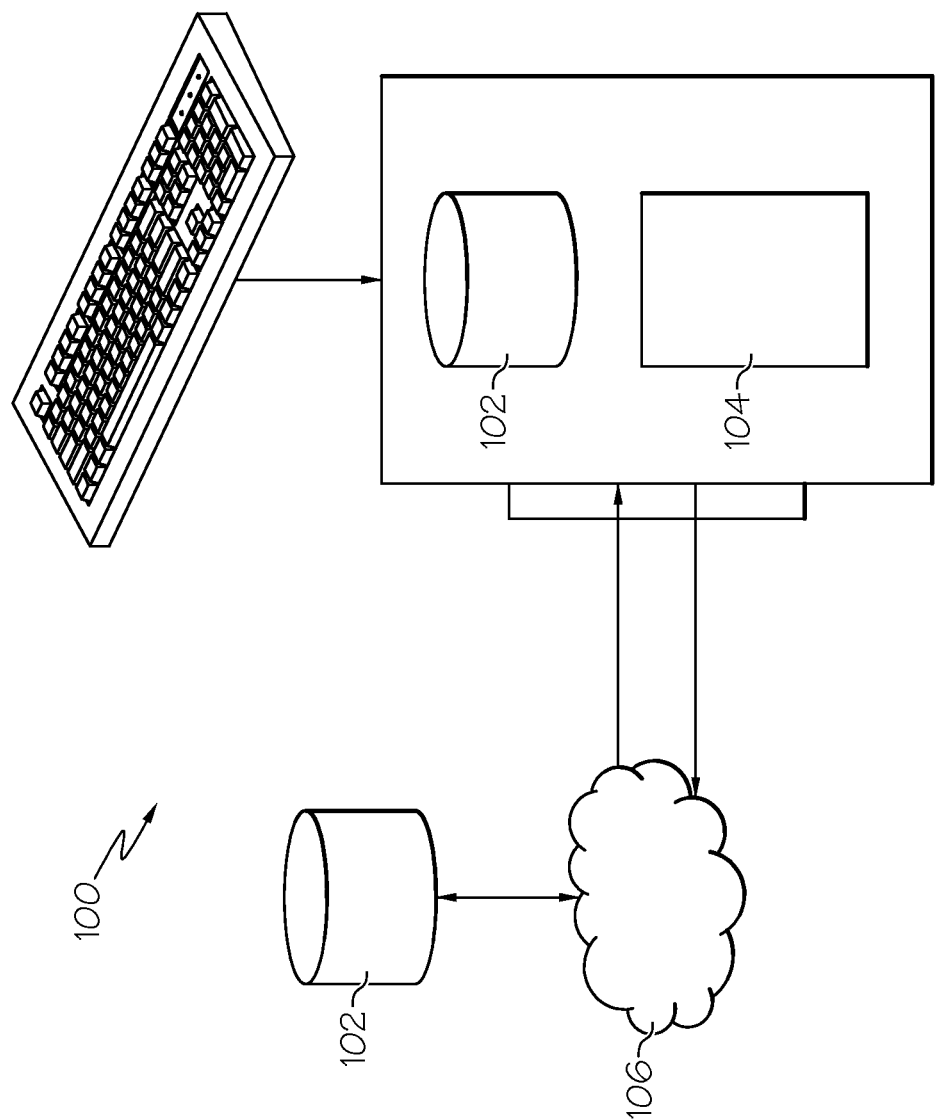
FIG. 1 depicts a simplified functional block diagram of an exemplary embodiment of a maintenance reasoner system.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Referring first to FIG. 1, a simplified functional block diagram of an exemplary embodiment of a maintenance reasoner system 100 is depicted and includes one or more data sources 102 and a processor 104. The data sources 102 may store thereon a set of instructions that, when executed by the processor 104, causes the system 100 to search the data sources 102 for one or more maintenance plans (e.g., isolation procedures and repair procedures) that are likely to identify and/or correct a fault within an ambiguity group. Before proceeding further, it is noted that when a malfunction occurs in a complex machine or system, the root cause may stem from one of several potential faults. Some root causes may be expected and some may not be readily apparent. A group of several potential faults that may cause a malfunction is referred to herein as an ambiguity group.

The data sources 102 may be implemented as a single device within the system 100 or as a plurality of devices in operable communication with each other and with the processor 104. The data sources 102 may be implemented using any suitable type of volatile or non-volatile memory devices such as, for example, flash memory, random access memory, read only memory, programmable read only memory, electronic erasable read only memory, programmable logic devices, magnetic disks, optical disks and any suitable memory devices that currently exists or is developed in the future. In some embodiments, the data sources 102 may be implemented as, or additionally include, one or more remote devices in operable communication with the processor via a network 106. Some exemplary, non-limiting networks include an intranet, the internet, a virtual private network, any of which may be wired or wireless, or any one of numerous other suitable networks.

No matter the specific configuration and implementation of the one or more data sources 102, each is in operable communication with, and is configured to supply diagnostic data to, the processor 104. The diagnostic data that are supplied by the one or more data sources are, or at least include, data representative of potential independent faults within a system. Each of the potential independent faults has a unique corrective maintenance plan associated therewith, and thus the diagnostic data may additionally include, for example, one or more of repair actions, isolation actions, casualty identification information, estimated completion time, cost of parts, cost of labor, waiting time cost, and the like. When a malfunction occurs in a complex machine or system, the root cause may stem from one of several potential faults. Some root causes may be expected and some may not be readily apparent. A group of several potential faults that may cause a malfunction is referred to herein as an ambiguity group or an ambiguity set.

The processor 104 is in operable communication with the data sources 102 and is configured to at least selectively retrieve diagnostic data therefrom. The processor 104 is additionally configured to implement a process to generate maintenance plan data. More specifically, the processor 104 is configured to process the diagnostic data retrieved from the data sources 102 to select a single corrective maintenance plan, and generate maintenance plan data representative of the selected corrective maintenance plan.

Although many maintenance reasoner systems may generally implement the functionality described above, these reasoned systems are implemented as deterministic systems. Conversely, the depicted maintenance reasoner system 100 is implemented as a non-deterministic maintenance reasoner system. As used herein, a non-deterministic maintenance reasoner system is one that will not always select the same maintenance plan for identical sets of two or more potential independent faults. To do so, the processor 104 is preferably configured to implement a differential game to select only one of a plurality of potential corrective maintenance plans.

The skilled artisan will appreciate that the processor 104 may be configured to implement any one of numerous differential games, from the relatively simple to the relatively complex. It is noted, however, that each of the unique corrective maintenance plans has at least one outcome determinable factor associated therewith, and that the differential game that is implemented is based, at least in part, on the at least one outcome determinable factor. Thus, the generated maintenance plan data will provide a long-term deterministic average of the at least one outcome determinable factor. The particular outcome determinable factor may vary and may include, for example, cost, time to repair, skill levels required for repair, and tools/parts availability for repair, just to name a few. It is noted, however, that skills, tools, parts and numerous other factors could, in many instances, be expressed as some function of time and cost.

For clarity and completeness, an example of how the non-deterministic maintenance reasoner system 100 may implement a relatively simple differential game to minimize long-term average cost will now be described. In doing so, reference should be made to FIG. 2, which depicts a table of the costs of implementing unique maintenance plans associated with two potential independent (and mutually exclusive) faults. In the depicted example, there are two unique maintenance plans 202-1, 202-2 for the ambiguity group that contains a first fault 204-1 and a second fault 204-2, each having an associated implementation cost 206-1 through 206-6. Specifically, the first fault 204-1 may be corrected by implementing a first maintenance plan 202-1 at a first cost 206-1 of 3 units, and the second fault 204-2 may be corrected by implementing a second maintenance plan 202-2 at a second cost 206-2, which in this example is also 3 units. Moreover, as the table 200 also depicts, in this example, there is a third possible maintenance plan 202-3, which is associated with a decision to implement both the first and second maintenance plans 202-1, 202-2. The cost associated with implementing the third maintenance plan 202-3 is 5 units (one less than 3+3). This is because the repaired components are in the same subsystem, and thus the system does not need to be opened and put together twice.

Because the two faults are mutually exclusive, it may be assumed that the first fault 204-1 occurs with a first probability (p) and the second fault 204-2 occurs with a second probability (1−p). The last row in the table 200 provides calculations of the average maintenance plan costs 208-1, 208-2, and 208-3 for each of the three different maintenance plans 202-1, 202-2, and 202-3 over several occurrences of this particular ambiguity group for the given probabilities. As may be appreciated, the lowest cost can only be determined if the first probability (p) is known. Conventional deterministic reasoners are configured to select one of the unique maintenance plans 202-1, 202-2 when the first probability (p) is known or is at least a given. However, when the first probability (p) is unknown, conventional deterministic reasoners must rely on an assumed value of the first probability (p). In such instances the assumed value may be such that one of the other two plans is optimal.

For the depicted example, it is desirable to come up with a maintenance plan that, on average, will provide an optimal cost. Here, because the costs associated with each of the two unique maintenance plans 202-1, 202-2 is equal (both are 3 units), the processor 104 is configured randomly recommend that one of the unique maintenance plans 202-1 (202-2) be implemented first, with a probability of 0.5, and that the other unique maintenance plan 202-2 (202-1) be implemented if the already implemented maintenance plan does not cure the fault. Thus, the processor will recommend either of the two maintenance plans be done first depending on chance (e.g., 0.5 probability). The one that is recommended first will, however, not always be the same.

The average cost of this non-deterministic process over several recommendations may be represented as follows:

$$\text{Avg. Cost} = 0.5[\text{Average cost of Mx Plan1}] + 0.5[\text{Average cost of Mx Plan2}]$$

$$= 0.5[3p + 6(1-p)] + 0.5[6p + 3(1-p)]$$

$$= 4.5$$

Significantly, that the average cost of this non-deterministic plan is 4.5 units regardless of the actual value of the first probability (p). Thus, this maintenance plan provides deterministic long-term costs in the absence of information (e.g., the value of the first probability (p)) by essentially "hedging the bets." Given the lack of information (e.g., the value of the first probability (p)), no other plan can guarantee a lower average cost.

The non-deterministic process described above provides at least two benefits. First, it provides a deterministic average cost. Second, it provides an average cost guarantee. These two benefits are highly desirable for reliable cost/profit projections, and for pricing of maintenance contracts. Conversely, the deterministic maintenance plans in table 200 offer non-deterministic costs and only worst or best case average cost guarantee but not the true average cost.

The non-deterministic maintenance reasoner system and method disclosed herein is based on game theoretic and decision theoretic approaches. It thus offers optimal solutions when complete information is unavailable. The reasoned system and method provides non-deterministic, yet optimal outputs, when complete information is unavailable. When complete information is available, the non-deterministic reasoner system implements a deterministic reasoner system.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for supplying a corrective maintenance plan for a system, the method comprising the steps of:
    supplying diagnostic data to a processor, the diagnostic data representative of a set of two or more potential independent faults within the system, each of the potential independent faults in the set having a unique corrective maintenance plan associated therewith;
    processing the diagnostic data, in the processor, to select only one of the unique corrective maintenance plans; and
    generating, in the processor, maintenance plan data representative of the selected corrective maintenance plan,
    wherein:
        for identical sets of two or more potential independent faults, the selected one of the unique maintenance plans is not always the same, and
        the processor implements a differential game to select only one of the unique corrective maintenance plans.

2. The method of claim 1, wherein:
    each of the unique corrective maintenance plans has at least one outcome determinable factor associated therewith; and
    the method further comprises implementing the differential game based on the at least one outcome determinable factor.

3. The method of claim 2, wherein the at least one outcome determinable factor includes cost.

4. A non-deterministic maintenance reasoner, comprising:
a processor adapted to retrieve diagnostic data representative of a set of two or more potential independent faults within a system, each of the potential independent faults in the set having a unique corrective maintenance plan associated therewith, the processor configured to:
  process the diagnostic data to select only one of the unique corrective maintenance plans, and
  generate maintenance plan data representative of the selected corrective maintenance plan,
  wherein:
    for identical sets of two or more potential independent faults, the selected one of the unique maintenance plans is not always the same, and
    the processor is further configured to implement a differential game to select only one of the unique corrective maintenance plans.

5. The reasoner of claim 4, wherein:
each of the unique corrective maintenance plans has at least one outcome determinable factor associated therewith; and
the processor is further configured to implement the differential game based on the at least one outcome determinable factor.

6. The reasoner of claim 5, wherein the at least one outcome determinable factor includes cost.

7. A non-deterministic maintenance reasoner system, comprising:
a data source configured to supply diagnostic data representative of a set of two or more potential independent faults within a system, each of the potential independent faults in the set having a unique corrective maintenance plan associated therewith; and
a processor in operable communication with the data source to at least selectively retrieve the diagnostic data therefrom, the processor configured to:
  process the diagnostic data to select only one of the unique corrective maintenance plans, and
  generate maintenance plan data representative of the selected corrective maintenance plan,
  wherein:
    for identical sets of two or more potential independent faults, the selected one of the unique maintenance plans is not always the same, and
    the processor is further configured to implement a differential game to select only one of the unique corrective maintenance plans.

8. The system of claim 7, wherein:
each of the unique corrective maintenance plans has at least one outcome determinable factor associated therewith; and
the processor is further configured to implement the differential game based on the at least one outcome determinable factor.

9. The system of claim 8, wherein the at least one outcome determinable factor includes cost.

\* \* \* \* \*